(12) United States Patent
Hyon et al.

(10) Patent No.: US 7,852,821 B2
(45) Date of Patent: Dec. 14, 2010

(54) SIGNALLING METHOD OF DETECTING HIDDEN INCUMBENT SYSTEM IN COGNITIVE RADIO ENVIRONMENT AND CHANNEL FRACTIONING METHOD USED TO ENABLE THE METHOD

(75) Inventors: Tae-In Hyon, Yongin-si (KR); Sang-Jo Yoo, Incheon (KR); Jae Moung Kim, Incheon (KR); Jae Hak Chung, Incheon (KR); Hyun Ju Kim, Incheon (KR)

(73) Assignees: Samsung Electronics Co., Ltd., Suwon-si (KR); INHA-Industry Partnership Institute, Incheon (KR)

( * ) Notice: Subject to any disclaimer, the term of this patent is extended or adjusted under 35 U.S.C. 154(b) by 601 days.

(21) Appl. No.: 11/708,594

(22) Filed: Feb. 21, 2007

(65) Prior Publication Data

US 2008/0014880 A1 Jan. 17, 2008

(30) Foreign Application Priority Data

Jul. 14, 2006 (KR) ...................... 10-2006-0066601

(51) Int. Cl.
*H04Q 7/24* (2006.01)
(52) U.S. Cl. .................... 370/341; 370/438; 370/445
(58) Field of Classification Search ......... 370/252–253, 370/329–330, 338, 346, 431, 437, 445, 447, 370/449–455, 461, 462; 455/63.1, 63.3, 455/161.1–161.3, 450, 509
See application file for complete search history.

(56) References Cited

U.S. PATENT DOCUMENTS

| 5,661,727 | A | 8/1997 | Kermani et al. | |
|---|---|---|---|---|
| 7,376,425 | B2 * | 5/2008 | Laroia et al. | 370/330 |
| 2004/0029590 | A1 | 2/2004 | Wentink | |
| 2006/0030318 | A1 * | 2/2006 | Moore et al. | 455/434 |
| 2008/0259811 | A1 * | 10/2008 | Cordeiro et al. | 370/252 |

OTHER PUBLICATIONS

PCT International Search Report and Written Opinion issued in corresponding PCT International Application No. PCT/KR2007/002718 dated Sep. 11, 2007.

* cited by examiner

*Primary Examiner*—Ricky Ngo
*Assistant Examiner*—Pao Sinkantarakorn

(57) ABSTRACT

A signaling method between a cognitive radio (CR) base station and a CR terminal in a CR environment, and a channel division method used for the signaling method, includes: detecting a channel usage of an incumbent system, which communicates with a CR base station; sensing an outband channel to communicate with the CR base station; receiving an EOS, which is broadcasted from the CR base station via the outband channel according to a predetermined period; and transmitting a sensing report signal with respect to the channel to the CR base station.

29 Claims, 10 Drawing Sheets

SIGNALLING METHOD OF DETECTING HIDDEN INCUMBENT SYSTEM IN COGNITIVE RADIO ENVIRONMENT AND CHANNEL FRACTIONING METHOD USED TO ENABLE THE METHOD

CROSS-REFERENCE TO RELATED APPLICATION

This application claims the benefit of Korean Application No. 2006-66601, filed Jul. 14, 2006, in the Korean Intellectual Property Office, the disclosure of which is incorporated herein by reference.

BACKGROUND OF THE INVENTION

1. Field of the Invention

Aspects of the present invention relate to a signaling method between a cognitive radio (CR) base station and a CR terminal in a CR environment, and a channel division method which is used for the signaling method, and more particularly, to a signaling method between a CR base station and a CR terminal, which can solve a communication error between the CR base station and the CR terminal, caused by interference of an incumbent system, and also solve an interference, which may affect a user of the incumbent system, when the CR base station does not recognize the incumbent system in a CR environment, and a channel division method used for the signaling method.

2. Description of the Related Art

A cognitive radio (CR) technology adjusts a frequency usage band of an operating system according to a neighboring environment. In this instance, examples of the CR technology include policies and technical methods which can intelligently utilize a frequency, such as a frequency detection and dynamic frequency change, a Detection and Avoidance (DAA) with respect to an allowed system and coexistence, a DAA with an identical CR system and coexistence, and the like. To effectively utilize limited frequency resources via publicly available frequency resources, a new technical requirement is necessary for existing wireless communication systems. However, a communication system, which utilizes a CR technology, must have a sensing ability, a cognitive ability, and an adaptability with respect to resources.

An Institute of Electrical and Electronics Engineers (IEEE) 802.22 Wireless Regional Area Network (WRAN) Working Group is preparing a standard with respect to a physical (PHY) and Media Access Control (MAC) layer interface. The interface enables a non-allowed system to utilize a spectrum, which is assigned to a television (TV) broadcasting service, based on the CR technology. To coexist with an incumbent system and avoid an interference, which may affect existing services such as a TV broadcast, a wireless microphone, and the like, a MAC protocol of IEEE 802.22 enables a CR base station to dynamically change a channel currently in use, or a power of a CR terminal when a usage of a spectrum, used by the incumbent system, is detected.

Hereinafter, an example of a hidden incumbent system in a CR environment will be described with reference to FIG. 1.

FIG. 1 is a diagram illustrating a hidden incumbent system in a CR environment according to the conventional art. In FIG. 1, a CR base station 100 provides a service to CR terminals 101, 102, and 103 by using a channel x. An incumbent system 104 may start the service for incumbent terminals 106 and 107 by using the channel x. The incumbent system 104 illustrated in FIG. 1 is, for example, a sky wave TV system. In the case of the incumbent system 104, a service time schedule is generally fixed. However, a communication service, such as breaking news, and the like, may be provided in an unscheduled time zone. Therefore, since the CR base station 100 is located in an area out of a signal range of the incumbent system 104, the CR base station 100 may not recognize the existence of the incumbent system 104. Thus, the CR base station 100 continuously provides a service to the CR terminals 101, 102, and 103 using the channel x. Also, since the incumbent terminal 107 is located in an area where signals of the CR base station 100 and the incumbent system 104 are overlapping, the incumbent system 107 is affected by an interference due to the CR base station 100. The CR terminal 102 is also located in the overlapping area, and thus may not inform the CR base station 100 of a channel occupation status of the incumbent system 104 due to a strong signal of the incumbent system 104. In this circumstance, the CR base station 100 may not recognize the incumbent system 104 and the incumbent system 104 is called a hidden incumbent system.

As illustrated in FIG. 1, a method in which the CR terminals 101, 102, and 103 may transmit sensed channel information and information about an interference channel to the CR base station 100, to stop the CR base station 100 from providing a service to the CR terminals 101, 102, and 103 via a certain channel which is being used by the incumbent system 104, is required.

SUMMARY OF THE INVENTION

Aspects of the present invention provide a signaling method which enables a CR base station to recognize a hidden incumbent system which uses a current service channel in a CR environment.

Aspects of the present invention also provide a signaling method which enables a CR base station to readily recognize a hidden incumbent system and also enables a DAA to be quickly performed, and thereby reduce an effect with respect to an incumbent system in a CR environment.

Aspects of the present invention also provide a signaling method which enables a CR base station to perform an acknowledgement response with respect to a sensing report signal, and thereby can reduce a number of times that the CR terminal retransmits the sensing report signal. In this instance, the sensing report signal is transmitted from a CR terminal, which detects a hidden incumbent system in a CR environment, to the CR base station.

Aspects of the present invention also provide a signaling method which can reduce a possible collision when at least two adjacent CR base stations broadcast Explicit Outband Signals (EOSs), and particularly, can reduce a collision of EOSs when scheduling data between the at least two CR base stations may not be transmitted, i.e., even when a communication between the at least two adjacent CR base stations is impossible.

Aspects of the present invention also provide a channel division method which can improve a bandwidth effectiveness of a channel by using a method of dividing a data transmission band and an EOS transmission band in a single channel.

Aspects of the present invention also provide a method which can stop broadcasting of EOS to a corresponding channel and transmit the EOS via another channel when a CR base station broadcasts the EOS, and in this instance, the different system using the corresponding channel is detected.

Aspects of the present invention also provide a method which enables a CR terminal, which desires to find a channel for a data transmission, to perform data communication by using a channel division, when the CR terminal does not find a channel which can utilize the entire band of the channel.

According to an aspect of the present invention, there is provided a signaling method which is performed by a cognitive radio (CR) base station in a CR environment, the method including: broadcasting an Explicit Outband Signal (EOS) via at least one outband channel according to a predetermined period; receiving a sensing report signal with respect to an incumbent system, which utilizes a predetermined channel, from a CR terminal which makes a communication via the outband channel; and switching the outband channel of the CR terminal to an available outband channel.

According to another aspect of the present invention, there is provided a signaling method which is performed by a CR terminal in a CR environment, the method including: detecting a channel usage of an incumbent system in a predetermined channel, which communicates with a CR base station; sensing an outband channel to communicate with the CR base station; receiving an EOS, which is broadcasted from the CR base station via the outband channel according to a predetermined period; and transmitting a sensing report signal with respect to the channel to the CR base station.

According to still another aspect of the present invention, there is provided a signaling method which is performed between a CR base station and at least one CR terminal in a CR environment, the method including: broadcasting an EOS from the CR base station to the at least one CR terminal via at least one outband channel; detecting a channel occupation of another system with respect to at least one outband channel; determining whether the other system corresponds to an incumbent system; and stopping the broadcasting of the EOS, searching for an available channel, and changing the outband channel into the located available channel when the other system corresponds to the incumbent system.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
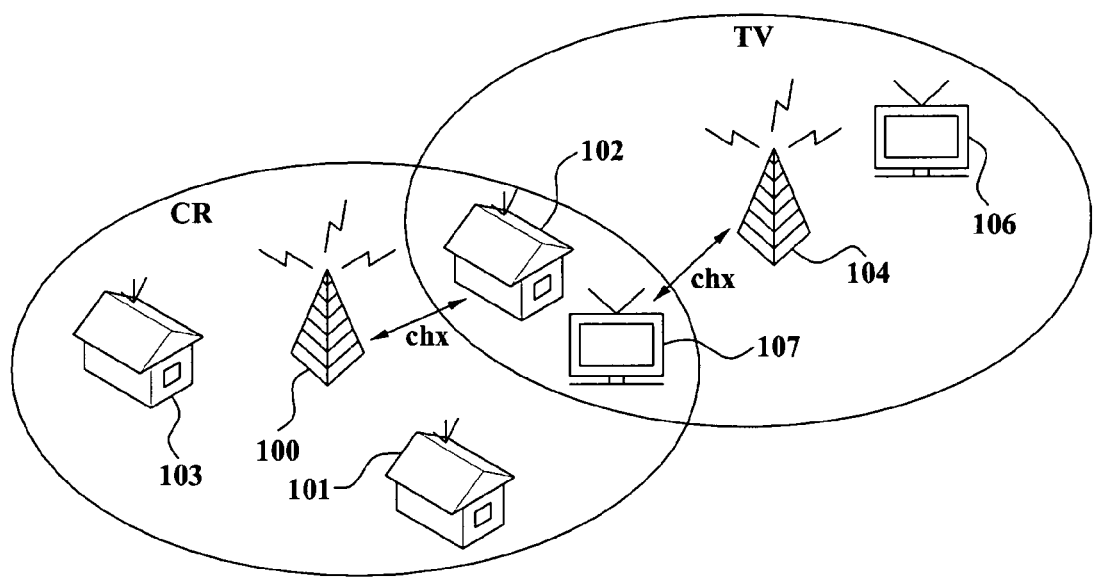
FIG. 1 is a diagram illustrating a hidden incumbent system in a CR environment according to a conventional art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the present specification, a cognitive radio (CR) technology in a CR environment, particularly, in an Institute of Electrical and Electronics Engineers (IEEE) 802.22 Wireless Regional Area Network (WRAN) Working Group is mainly described. However, it is only an example of an applicable field of the aspects of the present invention and thus, the present invention is not limited thereto.

Terms used throughout the present specification may be defined as follows:

1) a CR base station: designates a base station which provides a communication service in a CR environment;

2) a CR terminal: designates a terminal which receives the communication service from the CR base station;

3) an incumbent system: designates a system which occupies a corresponding channel and provides a service, and thus has a higher priority with respect to the corresponding channel in comparison to a system operating in a CR environment;

4) an incumbent terminal: designates a terminal which receives the service of the incumbent service;

5) an outband channel; designates a channel which is unused by both the incumbent system and a CR system; and 6) a hidden incumbent system: designates an incumbent system which imposes an interference to a CR user when the CR base station does not recognize an existence of the incumbent system.

Hereinafter, embodiments of the present invention will be described in detail with reference to the accompanying drawings.

Figure 2:
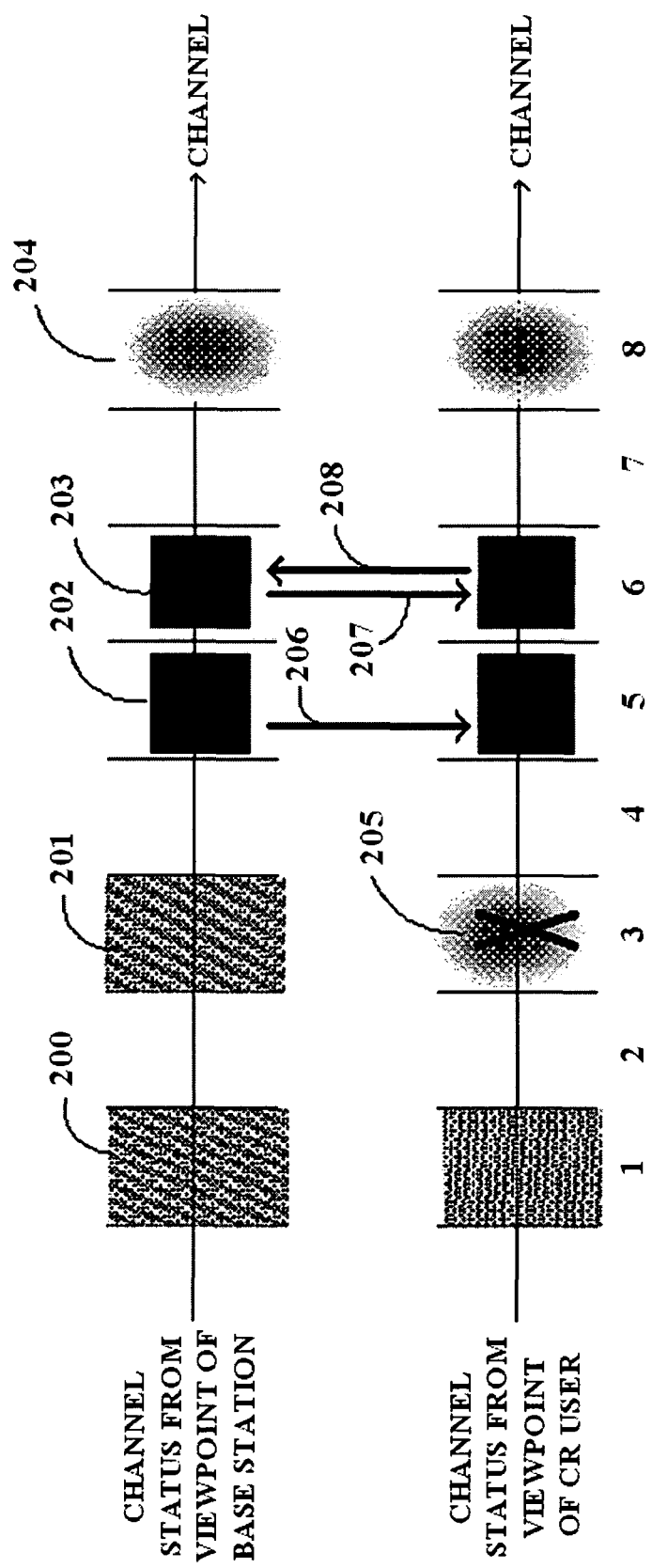
FIG. 2 is a diagram illustrating a process of transmitting an EOS by a CR base station according to an embodiment of the present invention.

FIG. 2 is a diagram illustrating a process of transmitting an EOS by a CR base station according to an embodiment of the present invention.

Referring to FIG. 2, the CR base station broadcasts information (EOS) about a channel (channel 1) 200 in use and a channel (channel 3) 201 according to a predetermined period by using outband channels, such as a channel (channel 5) 202 and a channel (channel 6) 203, excluding a channel (channel 4) 204 which is being used by an incumbent system (206 and 207). In this circumstance, when a hidden incumbent system utilizes the channel (channel 3) 201, a CR terminal using the channel (channel 3) 201 may not receive a downlink signal from the CR base station due to an interference of the hidden incumbent system (205). Also, the CR terminal senses another available channel to communicate with the CR base station. In this instance, when the CR terminal receives the outband signal while searching for another channel, the CR terminal recognizes that the corresponding channel is available, and informs the CR base station through an uplink, of the channel the incumbent system is using (208).

A frame structure of the EOS may be formed of a frame structure of a conventional physical (PHY) layer and MAC layer, which is to enable a broadcasted EOS to be detected even when the CR terminal does not include a specifically designed protocol or a physical layer module. In preparation that the hidden incumbent system suddenly occupies the channel which is being used by the CR terminal, the CR base station may broadcast an EOS to another available channel, excluding a channel which is being used for a data service, according to a predetermined period. Also, the CR terminal may detect a signal of the CR base station according to the predetermined period, i.e. an outband signaling period. In this instance, the outband signaling period may be determined according to a requisite detection time. The requisite detection time may be defined as time information which is required for the CR terminal to move a usage channel to another channel without causing an interference to an incumbent system when the incumbent system suddenly utilizes the usage channel of the CR terminal.

Figure 3:
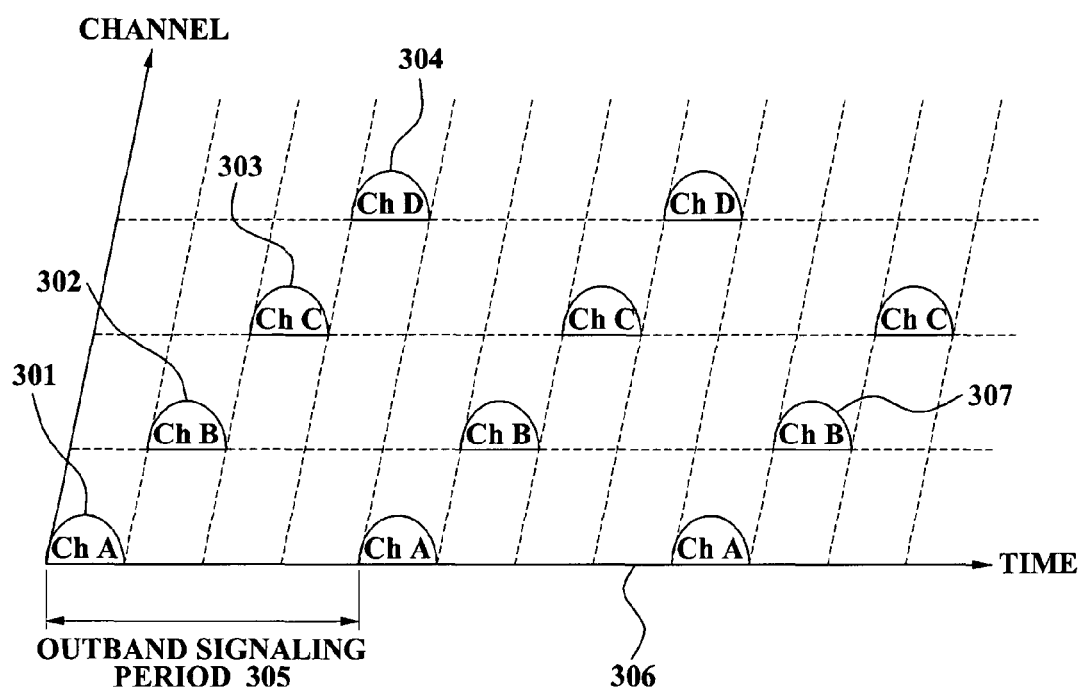
FIG. 3 is a diagram illustrating a process of sequentially broadcasting an EOS by a CR base station, and receiving the broadcasted EOS by a CR terminal according to an embodiment of the present invention.

FIG. 3 is a diagram illustrating a process of sequentially broadcasting an EOS by a CR base station, and receiving the broadcasted EOS by a CR terminal according to an embodiment of the present invention. Referring to FIG. 3, the CR base station sequentially broadcasts EOSs to an outband channel A 301, an outband channel B 302, an outband channel C 303, and an outband channel D 304 during an outband signaling period 305. When the CR terminal does not receive a signal of a channel x, which is being serviced by the CR base station, the CR terminal senses another channel to detect a signal of the CR base station. When the CR terminal does not receive the broadcasted EOS via the channel A 301 while sensing the channel, as indicated by a point 306, but detects the EOS of the CR base station via the channel B 302 as indicated by a point 307, a currently servicing channel identifier may be recognized from the EOS. Also, when a communication between the usage channel x of the CR terminal and the CR base station is impossible due to a channel occupation of the incumbent system, the CR terminal reports the channel occupation of the incumbent system to the CR base station. For the reporting, the CR terminal transmits a sensing report signal to the CR base station by using an uplink resource of an outband broadcast signal. In this instance, the sensing report signal includes report information. Thus, the CR base station may identify the channel occupation of a hidden incumbent system and change the current service channel x into another available channel.

Figure 4A:
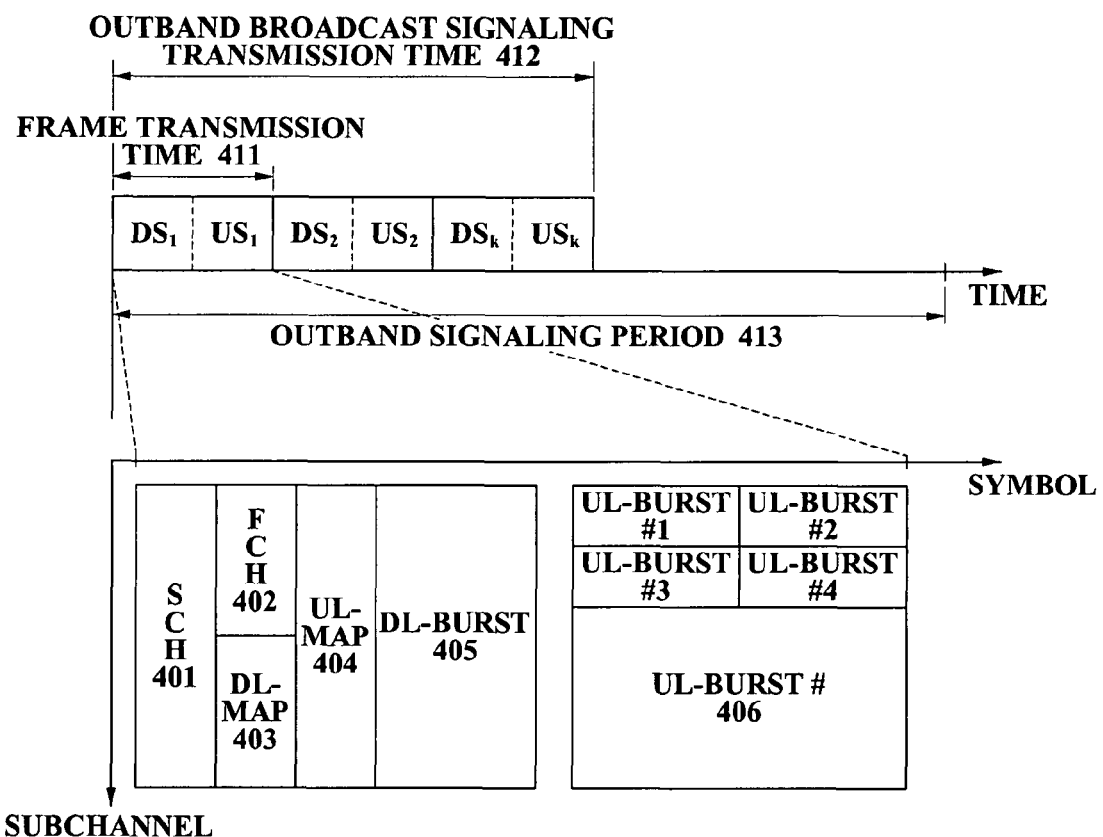
FIG. 4A is a diagram illustrating an example of a frame structure which includes an EOS according to an embodiment of the present invention.

FIG. 4A is a diagram illustrating an example of a frame structure of an outband broadcast signal which includes an EOS according to an embodiment of the present invention. Referring to FIG. 4A, as described above, the outband broadcast signal may have a frame structure of a widely utilized Orthogonal Frequency Division Multiple Access (OFDMA) frame. In this instance, the OFDMA frame includes a Superframe Control Header (SCH) 401, a Frame Check Header (FCH) 402, a downlink map (DL-MAP) 403, an uplink map (UL-MAP) 404, a downlink burst (DL-Burst) 405, and an uplink burst (UL-Burst) 406. The downlink map 403 designates a downlink resource assignment portion in a single OFDMA frame for each user. The uplink map 404 designates an uplink resource assignment portion in the single OFDMA frame for each user. The downlink burst 405 includes substantial data which is received for each user. Also, the uplink burst 406 transmits substantial data for each user.

The outband broadcast signal illustrated in FIG. 4A has an identical frame structure of a physical layer and MAC layer which the CR base station and the CR terminal transmit for a substantial service. Particularly, the SCH 401 is assigned with bit information which indicates whether a transmission frame corresponds to a MAC frame for substantial data transmission or corresponds to a MAC frame for outband broadcast. The downlink burst 405 includes information about a currently used service channel and an available service channel. When the CR terminal fails to receive a signal from the CR base station, the CR base station senses for another channel, detects the outband broadcast signal, and transmits a sensing report signal to the CR base station using the uplink burst 406. In this instance, the sensing report signal may include information that a communication is impossible with respect to a current service channel. When the CR terminal does not detect a signal of the incumbent system, the sensing report signal may further include information that the service channel is being used by the incumbent system. Also, the sensing report signal may additionally include various types of channel information which is measured by the CR terminal.

As illustrated in FIG. 4A, a k number of frames may be transmitted within a predetermined outband broadcast signaling transmission time 412 of a predetermined outband signaling period 413. In this instance, each of the frames has a frame transmission time 411. Technical descriptions with respect to transmission of the k number of frames will be made later.

Figure 4B:
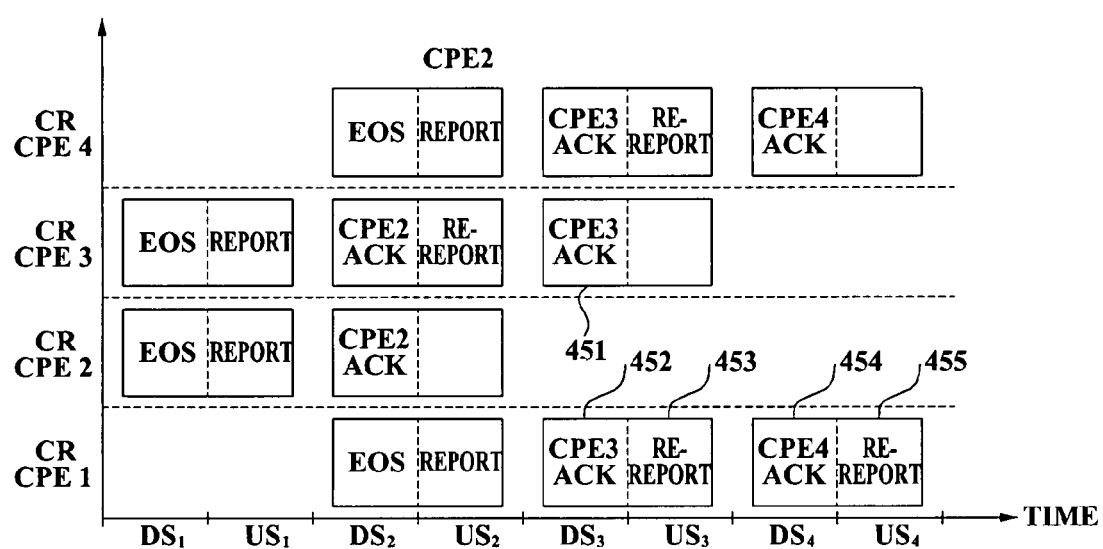
FIG. 4B is a diagram illustrating a method of transmitting an acknowledgement signal and a sensing report signal between a CR base station and at least one CR terminal according to an embodiment of the present invention.

FIG. 4B is a diagram illustrating a method of transmitting an acknowledgement signal and a sensing report signal between a CR base station and at least one CR terminal according to an embodiment of the present invention.

Referring to FIG. 4B, four CR terminals (CR CPE 1, CR CPE 2, CR CPE 3, and CR CPE 4) are located in a single CR system, and the CR base station transmits a first outband broadcast signal to the CR terminals (CR CPE 2 and CR CPE 3). In this instance, the CR terminals (CR CPE 2 and CR CPE 3) receive the first outband broadcast signal, and report to the CR base station via an uplink resource that a current service channel is being used by an incumbent system. Also, the CR terminals (CR CPE 1 and CR CPE 4) receive a second outband broadcast signal, and reports to the CR base station via an uplink resource that the current service channel is being used by the incumbent system. Accordingly, the CR base station receives a sensing report signal of the CR terminal (CR CPE 2) via the uplink resource of the first outband broadcast signal, and transmits an acknowledgement signal (CPE 2 ACK) with respect to the received sensing report signal via a downlink resource of the second outband broadcast signal. The CR terminal (CR CPE 2) receives the acknowledgement signal (CPE 2 ACK), and changes the current service channel into another channel without transmitting the sensing report signal. In this instance, since the acknowledgement signal does not correspond to a sensing report signal transmitted by the CR terminal (CR CPE 3), the CR terminal (CR CPE 3) retransmits, i.e., re-reports, the sensing report signal via the uplink resource of the second outband broadcast signal. The CR terminal (CR CPE 3) receives an acknowledgement signal (CPE 3 ACK 451), which is transmitted via a downlink resource of a third outband broadcast signal, and changes a channel into another channel, in which the other channel is the same as the CR terminal (CR CPE 2). Also, the CR terminals CR CPE 1 and 4, which transmit the sensing report signal via an uplink resource of a second frame, performs a retransmission like the CR terminals CR CPE 2 and CR CPE 3 (as illustrated in CPE 3 ACK 452 and a re-report 453). The CR terminal (CR CPE 1) receives a fourth outband broadcast signal. Also, since an acknowledgement signal (CPE 1 ACK 454) transmitted via the uplink resource does not correspond to a sensing report signal 453 transmitted by the CR terminal (CR CPE 1), the CR terminal CR CPE 1 retransmits, i.e., re-reports, a sensing report signal 455. A transmission/retransmission of a sensing report signal via a transmission of an acknowledgement signal ACK by a CR base station is performed using the above-described method.

Since a CR base station generally does not predict which CR terminal transmits a sensing report signal, an uplink resource may not be pre-assigned to the CR terminal which transmits the sensing report signal. Thus, when at least two CR terminals transmit a sensing report, which includes report information about a hidden incumbent system, to a CR base station, a collision may incur. To reduce the collisions and thereby improve a sensing report signal receiving rate of a CR base station, a maximum k number of frames is transmitted/received within an outband signaling period 413 during an outband broadcast signaling transmission time 412 as illustrated in FIG. 4A. Specifically, an outband broadcast signal is transmitted by including k information in the SCH 401 of the frame. Also, an acknowledgement signal with respect to a sensing report signal which is successfully received by the CR base station is transmitted via a next uplink. Through the operation, only an unsuccessfully received sensing report signal is retransmitted via a next uplink.

Figure 5:
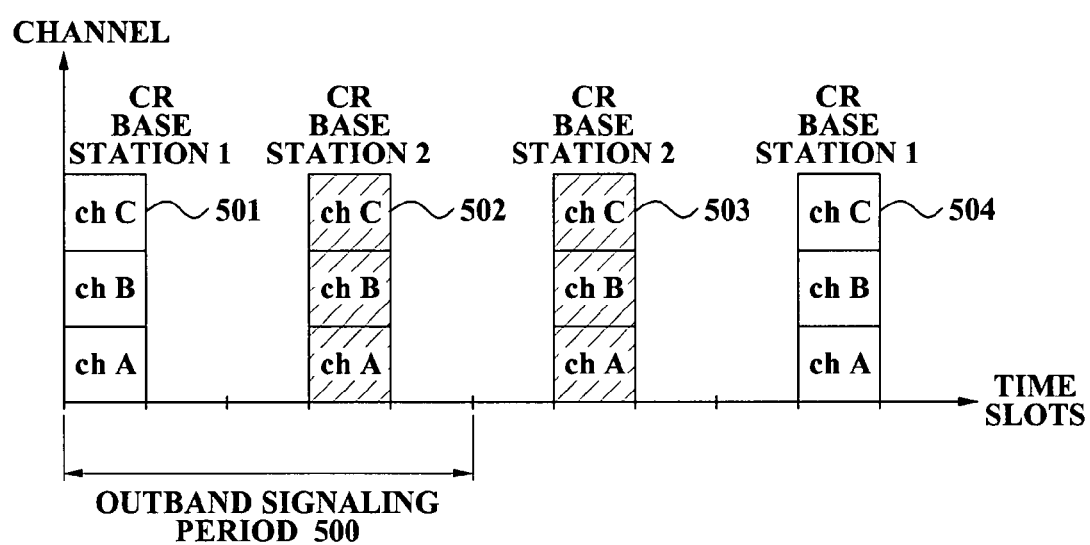
FIG. 5 is a diagram illustrating a method of broadcasting an EOS to a CR terminal via a plurality of transmitters by at least one adjacent CR base station according to an embodiment of the present invention.

FIG. 5 is a diagram illustrating a method of broadcasting an EOS to a CR terminal via a plurality of transmitters by at least one adjacent CR base station according to an embodiment of the present invention. FIG. 5 illustrates an example of a method of transmitting an EOS via a plurality of communication transmitters to avoid a collision which may occur when at least two adjacent CR base stations transmit outband broadcast signals.

When at least two adjacent CR base stations transmit a plurality of EOSs, a collision may occur between the transmitted EOSs. In this case, when the CR base stations exchange outband signaling scheduling data with respect to EOS broadcast and thereby transmit EOSs at a different time, the collision may be avoided. However, when the at least two adjacent CR base stations cannot communicate with each other, the CR base stations may not exchange the outband signaling scheduling data, and collision of the signals is possible. To avoid the collision of signals between the at least two adjacent CR base stations, a time slot is selected from a predetermined outband signaling period 500 and an EOS is transmitted during an outband broadcast signaling transmission time. An outband broadcast signal is transmitted via at least one of channels A, B, and C, and CR base stations 1 and 2 simultaneously transmit the outband broadcast signal to all the outband channels A, B, and C via a plurality of transmitters which are included in the CR base station 1 and 2 (as illustrated in transmissions 501, 502, 503, and 504). The CR base stations 1 and 2 randomly select a time slot every outband signaling period 500, and may simultaneously transmit the EOS to all the outband channels A, B, and C in the selected time slot.

Figure 6:
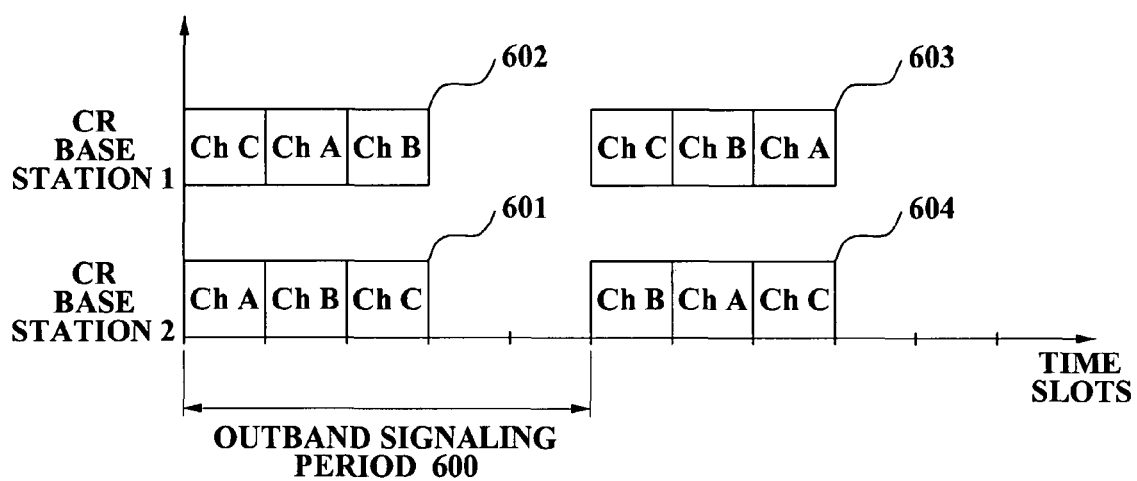
FIG. 6 is a diagram illustrating a method of broadcasting an EOS to a CR terminal via a single transmitter by at least one adjacent CR base station according to an embodiment of the present invention.

FIG. 6 is a diagram illustrating a method of broadcasting an EOS to a CR terminal via a single transmitter by at least one adjacent CR base station according to an embodiment of the present invention. FIG. 6 illustrates an example of a method of transmitting an EOS via a single communication transmitter to avoid a collision which may occur when at least two CR base stations transmit outband broadcast signals.

As similar to descriptions made with reference to FIG. 5, to avoid the collision between the at least two adjacent CR base stations, a different time slot is selected for each channel by using a single communication transmitter within a predetermined outband signaling period 600, and the EOS is sequentially transmitted in the selected time slot (as illustrated in selected time slots 601 and 602). In this instance, the EOS is transmitted during the outband broadcast signaling transmission time. CR base stations 1 and 2 randomly select a channel during a next outband signaling period, and transmit an EOS with respect to a single channel for each time slot (as illustrated in time slots 603 and 604).

Figure 7:
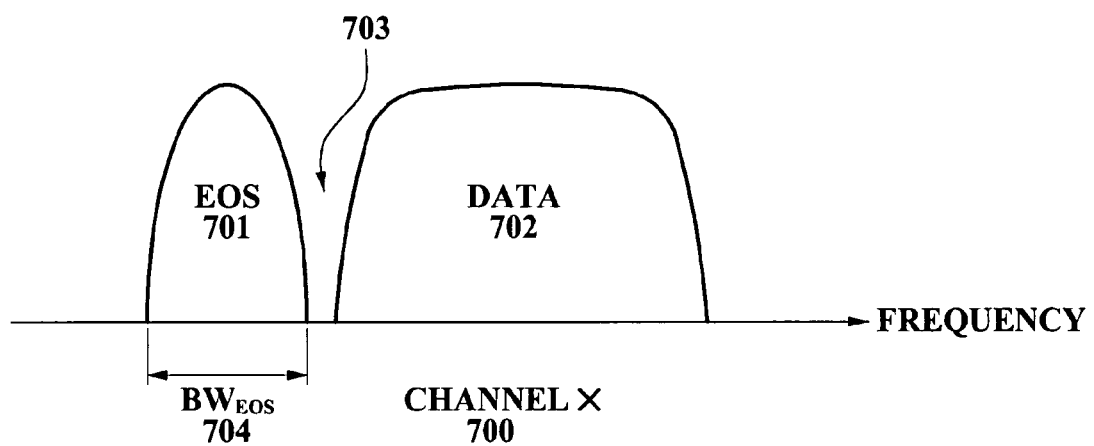
FIG. 7 is a diagram illustrating a structure of a channel which is divided into an area for a data transmission and an area where an EOS is transmitted with respect to a single available channel according to an embodiment of the present invention.

FIG. 7 is a diagram illustrating a structure of a channel which is divided into an area for a data transmission, and an area where an EOS is transmitted with respect to a single available channel according to an embodiment of the present invention. FIG. 7 illustrates a channel division method of transmitting an EOS to an outband channel by a CR terminal, using only a predetermined band location and a predetermined portion of a bandwidth of the entire available channel, and utilizing remaining channel resources for data transmission.

When the CR base station transmits the EOS via an outband channel x 700, an EOS frequency band 701 may be utilized. Another CR terminal may utilize a remaining channel portion 702 for a data transmission. Specifically, when transmitting the EOS, the CR base station utilizes only the EOS frequency band 701 with a comparatively small bandwidth 704, and includes a guard band 703 to prevent an interference within the same channel. Also, the remaining channel portion 702 is utilized by another CR terminal for a data transmission. Thus, a usage effectiveness of channel resources may be improved. The CR base station pre-defines the EOS frequency band 701 corresponding to a partial channel as a frequency band where the EOS may be transmitted, and allows outband signaling only in the EOS frequency band 701.

Figure 8:
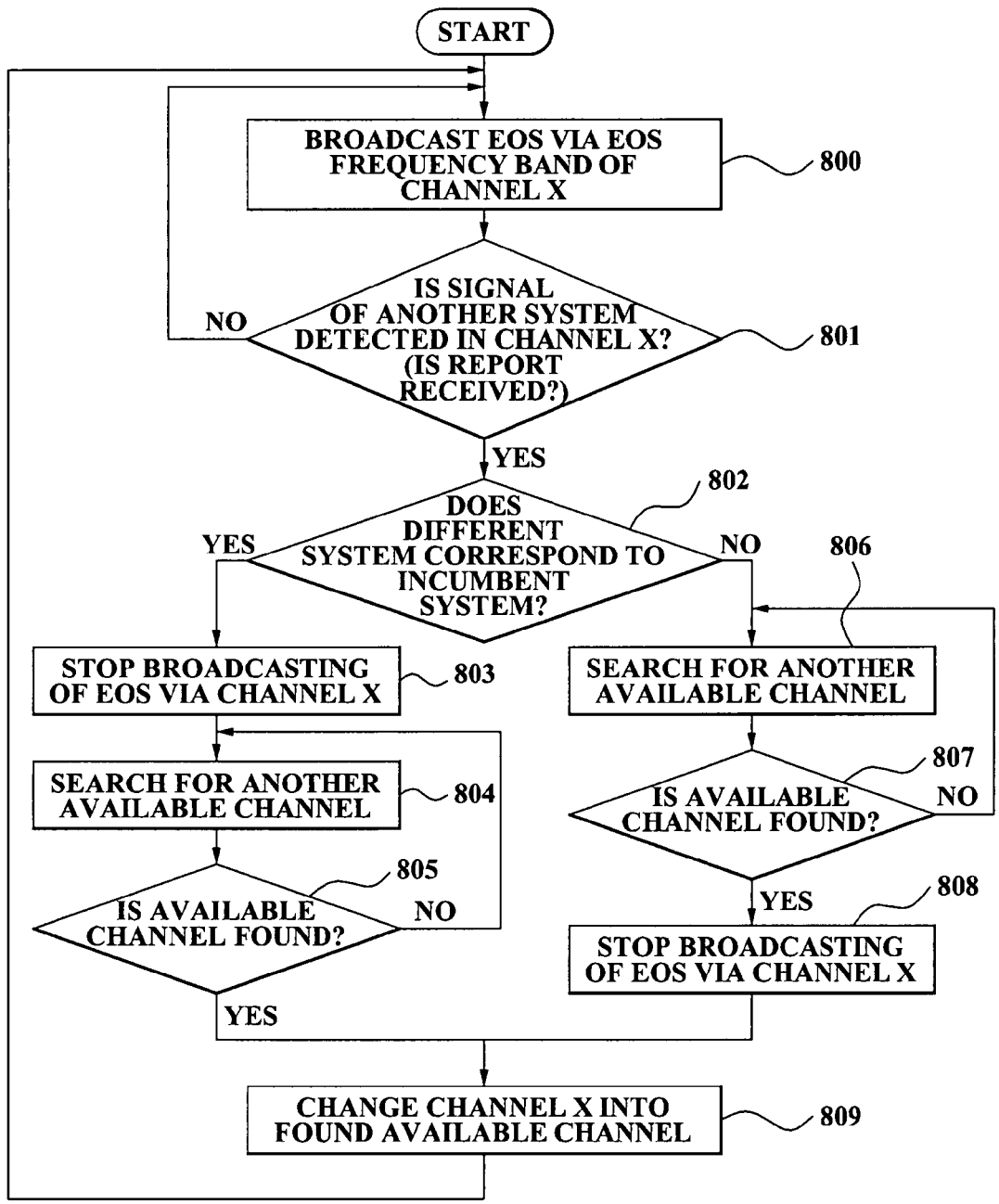
FIG. 8 is a flowchart illustrating a method of detecting an incumbent system and assigning a new channel to a CR terminal by using a channel division method according to an embodiment of the present invention.

FIG. 8 is a flowchart illustrating a method of detecting an incumbent system and assigning a new channel to a CR terminal by using a channel division method according to an embodiment of the present invention. FIG. 8 illustrates a process of stopping broadcasting of an EOS via a corresponding channel, searching for another available channel, and broadcasting the EOS through the available channel when the CR base station senses a channel occupation by an incumbent system or when the CR base station receives a report about the channel occupation of the incumbent system from the CR terminal.

As described with FIG. 7, in operation 800, the CR base station broadcasts an EOS via an EOS frequency band of a channel x. In operation 801, the CR base station detects a channel occupation of another system with respect to the channel x or determines whether a report about a channel occupation of an incumbent system is received from a CR terminal. In operation 802, when the channel occupation of the different system with respect to the channel x is detected or when the report about the channel occupation of the incumbent system is received from the CR terminal in operation 801, the CR base station determines whether the different system corresponds to the incumbent system.

In a CR environment, the incumbent system has a highest priority order with respect to a corresponding CR channel resource usage. Thus, when the channel occupation of the different system with respect to the channel x is performed by the incumbent system, the CR base station may immediately stop the broadcasting of the EOS via the channel x so as to prevent an interference with the incumbent system. Specifically, whether the different system corresponds to the incumbent system is determined in operation 802, and when the different system corresponds to the incumbent system as a result of the determination, the broadcasting of the EOS via the channel x is immediately stopped. Conversely, when the different system does not correspond to the incumbent system, the EOS may be transmitted via the EOS frequency band of the channel x until another available channel is found. Operation 802 may be preformed via a channel sensing method which is performed in a physical layer. Also, the channel sensing method includes energy detection and a fine/feature sensing. Also, a spectral correlation sensing method may be utilized to determine whether the different system corresponds to the incumbent system. In this instance, the energy detection may utilize a Received Signal Strength Indicator (RSSI) measurement of a signal which is transmitted from another system, and a multi-resolution spectrum sensing method. Also, the fine/feature sensing may utilize a fine energy-based detection, a signal feature detection, a cyclostationary feature detection, or the like. Depending upon the channel sensing method which is performed in the physical layer, a MAC layer may determine whether the different system corresponds to the incumbent system.

When the different system is determined to correspond to the incumbent system in operation 802, the CR base station stops the broadcasting of the EOS via the channel x in operation 803, searches for another available channel in operation 804, and determines whether the different available channel is found in operation 805. When the different available channel is found, the CR base station changes the channel x into the found available channel in operation 809. Conversely, when the different system is determined not to correspond to the incumbent system in operation 802, for example, when the different CR system utilizes a data transmission frequency band of the channel x, the CR base station searches for the different available channel in operation 806, and determines whether the different available channel is found in operation 807. When the different available channel is found, the CR base station stops the broadcasting of the EOS via the channel x in operation 808 and changes the channel x into the found available channel in operation 809.

Figure 9:
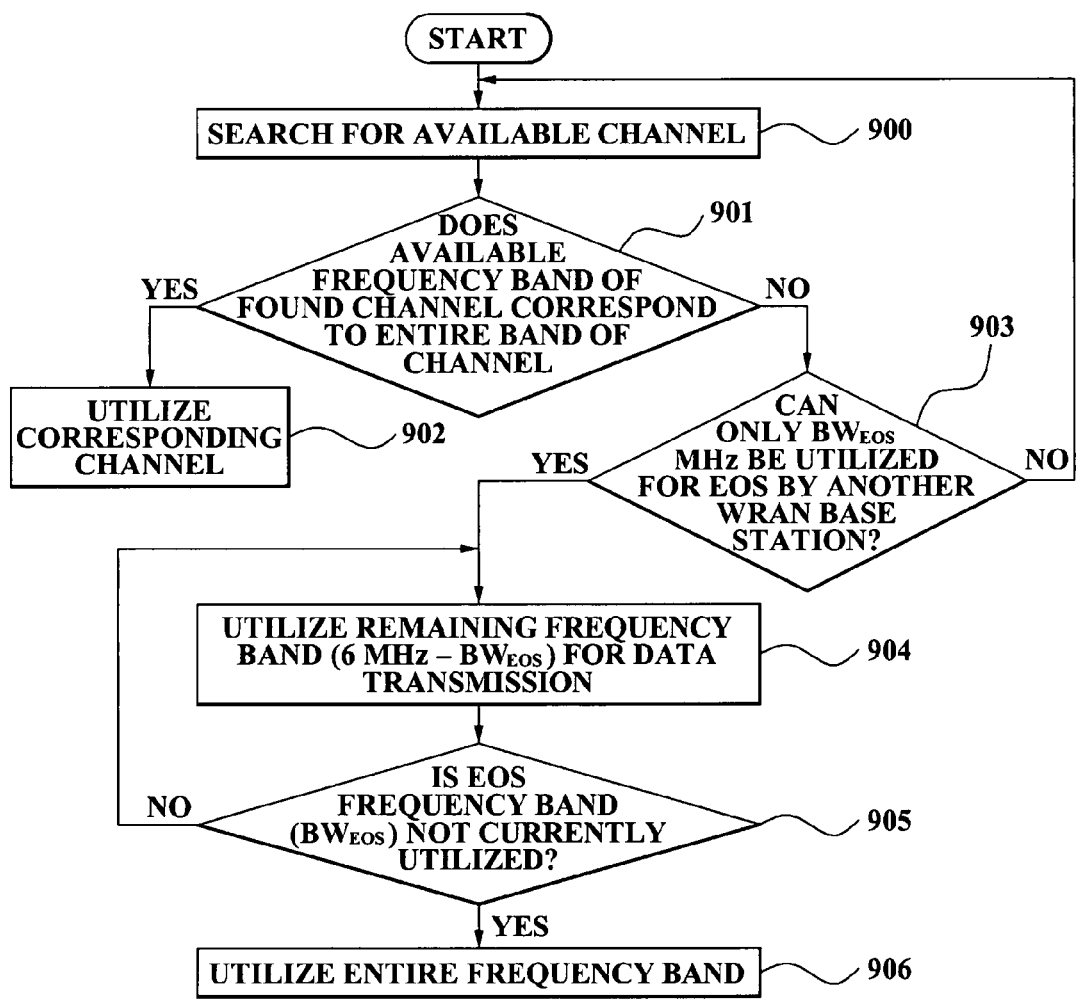
FIG. 9 is a flowchart illustrating an example of an operation method of a CR terminal in a CR environment which utilizes a channel division method according to another embodiment of the present invention.

FIG. 9 is a flowchart illustrating an example of an operation method of a CR terminal in a CR environment which utilizes a channel division method according to another embodiment of the present invention. FIG. 9 illustrates a method of searching for a channel where only an EOS frequency band is being utilized, by another CR base station and using a remaining frequency band for a data transmission frequency band, as described with FIG. 7, when the CR base station attempts to search for an available channel for a data transmission, but does not find a channel whose entire band is available.

In operation 900, the CR base station searches for a channel which can be utilized for data transmission. In operation 901, the CR base station determines whether an available frequency band of the found channel corresponds to the entire band of the channel. In operation 902, when the entire band of the channel is available, the CR base station utilizes the channel. Conversely, when the entire band of the channel is determined to be unavailable in operation 901, the CR base station determines, for example, whether only a remaining channel, which is acquired by subtracting a usage band $BW_{EOS}$, used during an outband broadcast signaling transmission time, from the entire band of the channel, is available in operation 903. When available, a remaining data transmission frequency band for data transmission in the channel is utilized in operation 904. As an example, when the entire bandwidth of the channel is 6 MHz, 6 MHz–$BW_{EOS}$ is utilized. In operation 905, the CR base station determines whether the band $BW_{EOS}$, which is utilized during an outband broadcast transmission time of the corresponding channel, is available. When the band $BW_{EOS}$ is available, the CR base station transmits/receives data using the entire band of the channel in operation 906.

Although several aspects of the present invention have been described based on a CR technology, which has been discussed in an IEEE 802.22 WRAN Working Group, the aspects of the present invention may be widely applicable to CR environments which adopt other methods in addition to an IEEE 802.22 WRAN.

According to aspects of the present invention, even when a CR base station does not directly recognize a channel occupation of an incumbent system in a CR environment, it is possible to reduce an interference which may affect an incumbent terminal by the CR base station. Also, an incommunicable CR terminal due to interference of the incumbent system may receive a seamless communication service.

Also, according to aspects of the present invention, when a CR base station broadcasts an EOS to a CR terminal, an acknowledgement signal that a sensing report signal is successfully received is included in the EOS. Thus, it is possible to reduce a collision probability of sensing report signals which are transmitted from a plurality of CR terminals, and also to reduce a time to acquire precise channel information.

Also, according to aspects of the present invention, when at least two adjacent CR base stations transmit a plurality of EOSs, and in this instance, outband signaling scheduling between the at least two adjacent CR base stations is not adjusted, it is possible to reduce an EOS collision probability between the at least two adjacent CR base stations and thereby improve an EOS receiving rate of a CR terminal.

Also, according to aspects of the present invention, a partial frequency band of a single channel is utilized to transmit an EOS, and a remaining frequency band is utilized for data transmission. Thus, it is possible to improve a channel usage effectiveness.

Also, according to aspects of the present invention, a CR base station may receive a sensing report signal from a CR terminal and transmit an EOS only within an outband broadcast signaling transmission time by using a channel division method. Also, the CR base station may utilize a remaining frequency band for data transmission. Thus, channel resources may be effectively utilized.

Although a few embodiments of the present invention have been shown and described, it would be appreciated by those skilled in the art that changes may be made to the embodiment without departing from the principles and spirit of the invention, the scope of which is defined by the claims and their equivalents.

What is claimed is:

1. A signaling method which is performed by a cognitive radio (CR) base station in a CR environment, the method comprising:

broadcasting an Explicit Outband Signal (EOS) via one or more outband channels, according to a predetermined period;

receiving a sensing report signal with respect to a system which utilizes at least one of the one or more outband channels, from a CR terminal which makes a communication via the one or more outband channels; and in response to receiving the sensing report, determining whether the sensed system is an incumbent system;

in response to determining the sensed system is an incumbent system, stopping transmission of an EOS on the at least one outband channel, finding an available outband channel, and switching the at least one outband channel of the CR terminal to the available outband channel; and in response to determining the sensed system is not an incumbent system, continuing to transmit the EOS on the at least one outband signal, searching for an available outband channel, and, if there is an available outband channel, switching the at least one outband channel of the CR terminal to the available outband channel.

2. The method of claim 1, wherein the predetermined period is determined according to a requisite detection time of the system.

3. The method of claim 1, wherein, in the CR environment, a frame is transmitted and/or received according to an Orthogonal Frequency Division Multiple Access (OFDMA) scheme, and the EOS is transmitted to the CR terminal via a downlink of the frame, and the sensing report signal is transmitted to the CR base station via an uplink of the frame.

4. The method of claim 1, wherein the EOS and the sensing report signal are transmitted and/or received via an EOS frequency band of the outband channel during an outband broadcast signaling transmission time.

5. The method of claim 1, wherein the switching comprises:

stopping the broadcasting of the EOS via the outband channel; and searching for the available outband channel.

6. The method of claim 1, further comprising:

transmitting an acknowledgement signal with respect to the sensing report signal to the CR terminal.

7. The method of claim 6, wherein, in the CR environment, a frame is transmitted and/or received according to an OFDMA scheme, and the EOS and the acknowledgement signal are transmitted to the CR terminal via a downlink of the frame, and the sensing report signal is transmitted to the CR base station via an uplink of the frame.

8. The method of claim 7, wherein the acknowledgement signal is transmitted via a k number of frames, which are transmitted within the predetermined period, and k is included in a Superframe Check Header (SCH) of the frame.

9. The method of claim 6, wherein the acknowledgement signal further includes identification information of the CR terminal which transmitted the sensing report signal, and the CR terminal, which did not receive the acknowledgement signal, retransmits the sensing report signal to the CR base station.

10. A signaling method which is performed by a cognitive radio (CR) terminal in a CR environment, the method comprising:

in response to not receiving a broadcasted explicit outband signal (EOS) from a CR base station on a first outband channel, detecting the first outband channel is being used by another system;

reporting the first channel occupation by the system to the CR base station;

in response to the system being an incumbent system, waiting for the CR base station to locate an available outband channel, and receiving an explicit outband signal (EOS) broadcasted from the CR base station via the available outband channel, according to a predetermined period;

in response to the system not being an incumbent system, attempting to receive the EOS via the first outband channel, and waiting for the CR base station to transmit the EOS via an available channel; and transmitting a sensing report signal with respect to the available channel to the CR base station.

11. The method of claim 10, wherein the sensing report signal includes information that the outband channel is unavailable.

12. The method of claim 11, wherein the sensing report signal includes information that the channel is being used by the incumbent, or includes channel information which is measured by the CR terminal.

13. The method of claim 10, wherein the predetermined period is determined according to a requisite detection time of the incumbent.

14. The method of claim 10, wherein, in the CR environment, a frame is transmitted/received according to an OFDMA scheme, and the EOS is transmitted to the CR terminal via a downlink of the frame, and the sensing report signal is transmitted to the CR base station via an uplink of the frame.

15. The method of claim 10, further comprising:

receiving an acknowledgement signal with respect to the sensing report signal from the CR base station.

16. The method of claim 15, further comprising:

retransmitting the sensing report signal to the CR base station when the acknowledgement signal is not received, wherein the acknowledgement signal further includes identification information of the CR terminal which transmitted the sensing report signal.

17. A signaling method which is performed between a cognitive radio (CR) base station and at least one CR terminal in a CR environment, the method comprising:

broadcasting an explicit outband signal (EOS) from the CR base station to the at least one CR terminal via one or more outband channels;

in response to at least one CR terminal not receiving a broadcasted explicit outband signal (EOS) from a CR base station, detecting a first outband channel with respect to the one or more outband channels is occupied by another system;

determining whether the system corresponds to an incumbent system;

in response to determining the system is an incumbent system, stopping the broadcasting of the EOS, searching for an available channel, and changing the outband channel into the located available channel; and in response to determining the system is not an incumbent system, continuing to transmit the EOS on the at least one outband signal, searching for an available outband channel, and, if there is an available outband channel, switching the at least one outband channel of the CR terminal to the available outband channel.

18. The method of claim 17, further comprising:

searching for the available channel, then stopping the broadcasting of the EOS via the channel when the other system does not correspond to the incumbent system.

19. The method of claim 17, wherein the broadcasting comprises:

selecting at least one time slot within a predetermined outband signaling period; and broadcasting the EOS via at least two outband channels using at least two transmitters in the selected time slot.

20. The method of claim 17, wherein the broadcasting comprises:

selecting at least one time slot within a predetermined outband signaling period; and sequentially broadcasting the EOS via at least two outband channels using a single transmitter in the selected time slot during an outband broadcast signaling transmission time.

21. A signaling method performed between a cognitive radio (CR) base station and at least one CR terminal in a CR environment, the method comprising:

broadcasting an explicit outband signal (EOS) from the CR base station to the at least one CR terminal via a first outband channel;

receiving a sensing report signal with respect to a system which utilizes at least one of the one or more outband channels, from a CR terminal which makes a communication via the one or more outband channels;

determining whether the sensed system occupying the first outband channel is an incumbent system;

in response to determining the system is an incumbent system, stopping the broadcasting of the EOS, searching for an available channel, and changing the outband channel into the located available channel; and in response to determining the system is not an incumbent system, continuing to broadcast the EOS via the first outband channel, searching for an available second outband channel, and if the second outband channel is available, terminating the broadcasting of the EOS and switching from the first outband channel to the second outband channel.

22. The method of claim 21, wherein the determining is performed via a channel sensing method in a physical layer.

23. The method of claim 22, wherein the channel sensing method includes energy detection method and a fine/feature sensing method.

24. The method of claim 23, wherein the energy detection method includes a received signal strength indicator (RSSI) measurement of a signal transmitted from the system and a multi-resolution spectrum sensing method.

25. The method of claim 23, wherein the fine/feature sensing method includes a fine energy-based detection method, a signal feature detection method and a cyclostationary feature detection method.

26. The method of claim 21, wherein, in the CR environment, a frame is transmitted and/or received according to an Orthogonal Frequency Division Multiple Access (OFDMA) scheme, and the EOS is transmitted to the CR terminal via a downlink of the frame, and the sensing report signal is transmitted to the CR base station via an uplink of the frame.

27. The method of claim 26, wherein the OFDMA frame includes a Superframe Control Header (SCH), a Frame Check Header (FCCH), a downlink map (DL-MAP), an uplink map (UL-MAP), a downlink burst (DL-Burst), and an uplink burst (UL-Burst).

28. The method of claim 21, wherein the CR base station transmits the EOS only within an outband broadcast signaling transmission time using channel division and the CR base station utilizes a remaining frequency band for data transmission.

29. The method of claim 21, wherein when the CR base station broadcasts the EOS to the CR terminal, an acknowledgment signal that a sensing report signal is successfully received is included in the EOS.

* * * * *